United States Patent [19]
Karnick et al.

[11] Patent Number: 5,802,728
[45] Date of Patent: Sep. 8, 1998

[54] LIQUID LEVEL AND ANGLE DETECTOR

[75] Inventors: Drew A. Karnick; William S. Watson, both of Eau Claire, Wis.

[73] Assignee: Watson Industries, Inc., Eau Claire, Wis.

[21] Appl. No.: 516,310

[22] Filed: Aug. 17, 1995

[51] Int. Cl.⁶ ................................................. G08C 19/10
[52] U.S. Cl. ............................................................ 33/366
[58] Field of Search .............................. 33/366; 324/679; 340/689; 73/304 C

[56] References Cited

U.S. PATENT DOCUMENTS

| | | | |
|---|---|---|---|
| 2,826,738 | 3/1958 | Lupfer et al. | 324/61 |
| 3,379,972 | 4/1968 | Foster et al. | 324/61 |
| 3,387,776 | 6/1968 | Stillwell et al. | 324/61 |
| 3,753,373 | 8/1973 | Brown | 73/398 |
| 3,783,374 | 1/1974 | Eide et al. | 324/60 |
| 3,857,092 | 12/1974 | Meyer | 324/679 |
| 3,862,571 | 1/1975 | Vogel | 73/304 |
| 3,906,471 | 9/1975 | Shawhan | 340/200 |
| 3,992,951 | 11/1976 | Erspamer et al. | 33/366 |
| 4,028,815 | 6/1977 | Buckley et al. | 33/366 |
| 4,054,833 | 10/1977 | Briefer | 324/679 |
| 4,093,915 | 6/1978 | Briefer | 324/60 |
| 4,167,697 | 9/1979 | Gerber | 324/60 |
| 4,167,818 | 9/1979 | Cantarella et al. | 33/366 |
| 4,418,569 | 12/1983 | Kühnel | 73/304 |
| 4,434,391 | 2/1984 | Swartz et al. | 318/662 |
| 4,459,541 | 7/1984 | Fielden et al. | 324/60 |
| 4,558,595 | 12/1985 | Kompelien | 73/336 |
| 4,567,435 | 1/1986 | Yamada et al. | 324/207 |
| 4,641,434 | 2/1987 | Engler | 33/366 |
| 4,642,555 | 2/1987 | Swartz et al. | 324/60 |
| 4,716,366 | 12/1987 | Hosoe et al. | 324/207 |
| 4,763,063 | 8/1988 | Shkedi | 324/60 |
| 4,799,047 | 1/1989 | Saitoh | 340/618 |
| 4,811,491 | 3/1989 | Phillips et al. | 33/366 |
| 4,833,393 | 5/1989 | Wetzel | 324/60 |
| 4,846,954 | 7/1989 | Ryan et al. | 33/366 |
| 4,908,783 | 3/1990 | Maier | 364/560 |
| 5,083,383 | 1/1992 | Heger | 340/689 |
| 5,138,559 | 8/1992 | Kuehl et al. | 364/509 |
| 5,155,467 | 10/1992 | Matsubara | 340/429 |
| 5,170,567 | 12/1992 | Davis et al. | 33/366 |
| 5,182,545 | 1/1993 | Goekler et al. | 340/620 |
| 5,237,753 | 8/1993 | Carlson et al. | 340/689 |
| 5,532,527 | 7/1996 | Zatler et al. | 73/304 C |

FOREIGN PATENT DOCUMENTS 0221016  5/1987  European Pat. Off. ................ 33/366

*Primary Examiner*—Ronald L. Biegel
*Attorney, Agent, or Firm*—Moore & Hansen

[57] ABSTRACT

A feedback circuit for generating an output signal from a sensor that makes changing electrical and temperature characteristics of the sensor and any sensing medium irrelevant. The sensor is placed in the forward loop of the circuit to make the output depend on the area of the parallel plates the sensor, not on any electrical or temperature characteristics of the sensor or sensing medium. A liquid filled sensor having parallel conducting plates, one solid and the other being split into two differential plate sections may be used in the forward loop as a liquid level sensor or an inclinometer. Alternative sensors such as inductive sensors may also be used.

38 Claims, 4 Drawing Sheets

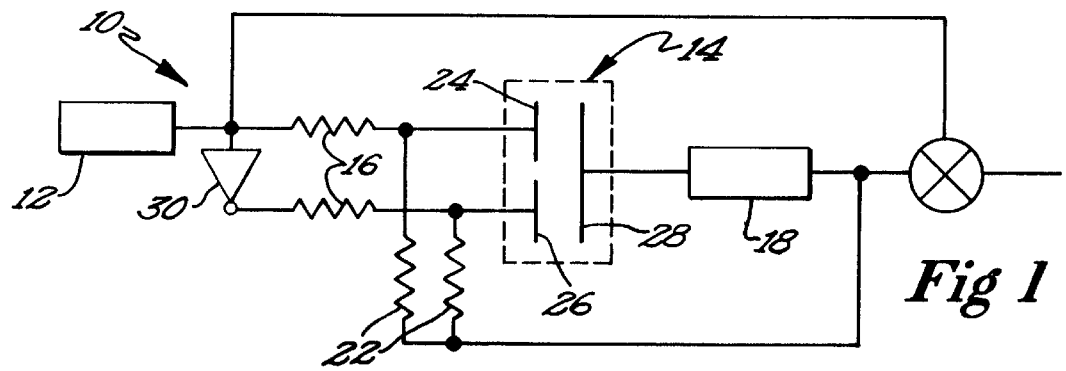
*Fig 1*
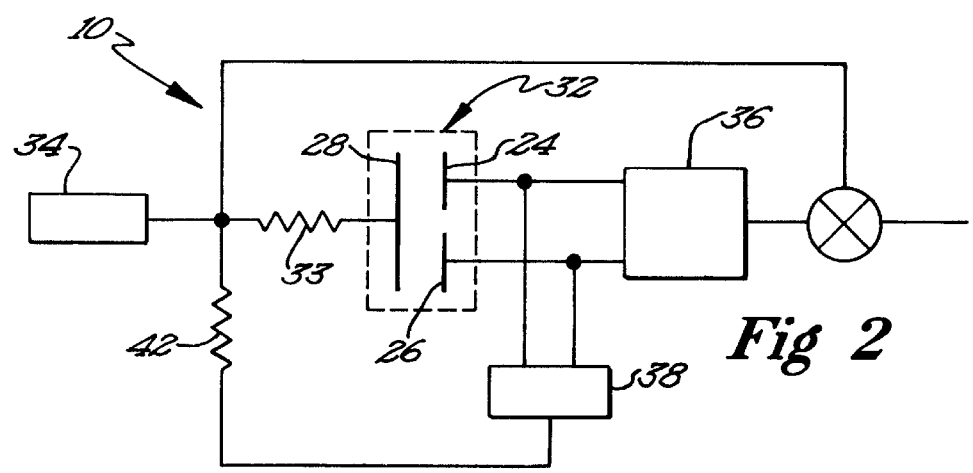
*Fig 2*
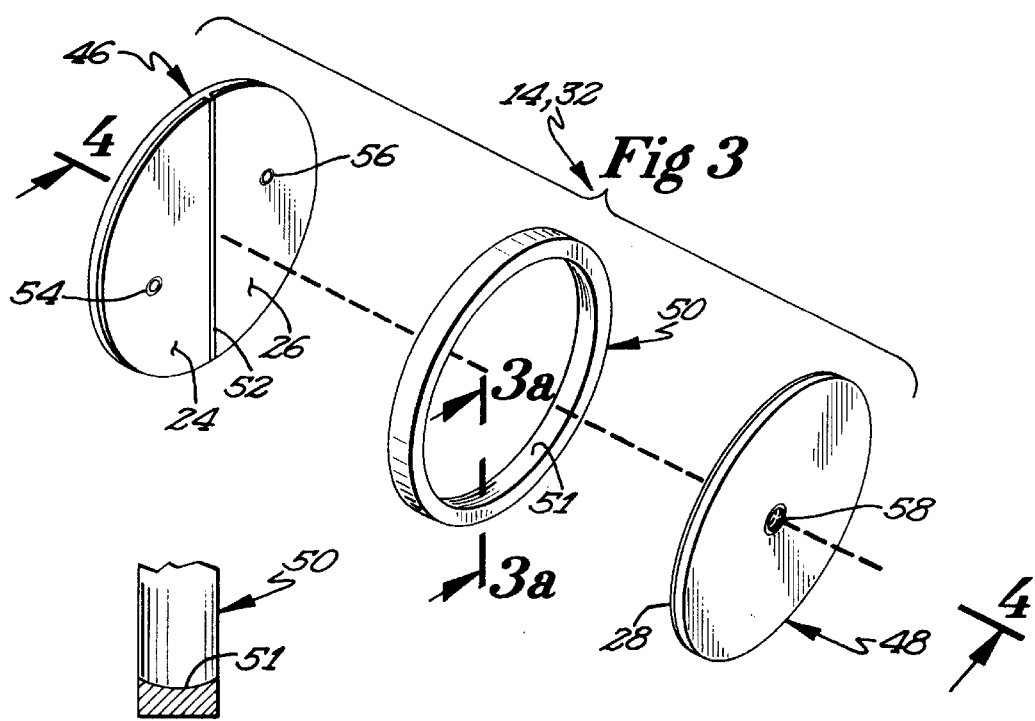
*Fig 3*
*Fig 3a*

LIQUID LEVEL AND ANGLE DETECTOR

BACKGROUND OF THE INVENTION

The present invention relates generally to the use of the electrical properties of a liquid to detect the level of liquid. More particularly, it relates to the use of a sensing medium placed inside of a feedback loop of a circuit to render the changing electrical and temperature characteristics of the sensor irrelevant, yet using the physical geometry of the vessel to provide accurate sensing of liquid levels and angles.

Numerous methods have been used to electrically detect the amount of liquid in a vessel. A float type sensor will simply cause the end of a sense arm to move an actuator of a position sensor depending upon the level of the liquid. Resistive element sensors consist of a chain of series connected discrete resistors immersed in a conductive liquid. If the liquid provides a conductive path between two connection nodes, the liquid will short out the resistive wire thereby decreasing the amount of resistance measured. The capacitance of dielectric liquids between parallel plates, coaxial cylindrical capacitors, or other similar capacitive geometry, can also be used to find level. If air fills the volume between the plates, measured capacitance is much lower than if the area were filled with oils or alcohol, which have much higher dielectric constants.

Level sensors involving the use of a load cell or other electronic weight sensors have also been used. The load cell produces a signal that represents the total weight of the tank and liquid. The actual weight of the liquid can be calculated by subtracting the weight of the tank. Using known information about the density, one can then calculate the level of liquid.

A carpenter's level can tell you if you are level but not the angle of inclination. Pendulous devices have also been used for some time but require mechanical parts to achieve high accuracy. Gravity type potentiometers consisting of resistance wires with wipers that would move a potentiometer are common; however, the wiper of the potentiometer has a limited life and has a history of wearing out. Numerous companies have used accelerometers to detect angle off of level but the main drawback of accelerometers is the expense required to achieve reasonable null accuracy.

The principles of liquid level can also be applied to detecting angular motion. Angle detection devices provide an output voltage proportional to tilt angle where tilting the sensor off level will cause an unbalanced electrical signal. The first known commercial electric liquid tilt sensors were electrolytic tilt sensors made by Fredericks. These devices provide an output voltage proportional to tilt angle where tilting the sensor causes an unbalanced resistance to a common electrode. Liquid angle sensors using similar principles but differential capacitive (as opposed to resistive) sensing are described in U.S. Pat. Nos. 3,906,471 and 4,642,555.

Disadvantages of prior systems include the requirement for mechanical parts that add complexity to the devices. Further, such mechanical parts inevitably wear out mechanically, causing breakdowns.

Sensors using liquid as a medium for sensing have been used before. Generally, the liquids used in these liquid sensors have electrical properties that change over temperature. A drawback to the use of electrical properties is the changes over temperature of those properties. Such temperature changes can be extreme in places where the sensors are often located, such as in gas and oil tanks, aircraft, and the like. Changing temperature in the liquid of the prior art sensors results in changes in scale factor and bias, relative to the changing characteristics of the fluid. Active temperature compensation to compensate for changing characteristics has been required for these sensors in order to allow them to provide adequate results. Such compensation has been accomplished using thermistors or by the physical construction of a compensating capacitance with an appropriate temperature coefficient to offset the temperature coefficient of the liquid being sensed or used in a sensor. Using mechanical structures for compensation causes a significant increase in cost and complexity. Using thermistors requires calibration and introduces an additional possible source of error. Additionally, the prior art has required minute attention to specific mechanical structures and tightly controlled capacitance in attempts to further control the amount of scale factor and bias changes due to the liquids used.

A significant problem in the prior art, therefore, is that properties of the sensor or the medium therein make the accurate use of such sensors difficult.

BRIEF SUMMARY OF THE INVENTION

It is an objective of the present invention to provide an output signal from a sensor circuit that is independent of the temperature and electrical characteristics of the sensor and sensing medium, and that is proportional to liquid level in a tank or angular displacement of the sensor.

It is another objective of the present invention to provide a liquid medium sensor for use in the sensor circuit.

It is yet another objective of the present invention to provide an output signal from a liquid sensor circuit utilizing parallel plates immersed in a liquid medium that is a function of the ratio of the area differential between the plates of the sensor.

It is still another objective of the present invention to provide a circuit and device usable as a liquid level sensor or a differential angle detector.

It is still yet another objective of the present invention to provide an inductive sensor for use with the sensor circuit.

The present invention accomplishes these objectives by providing a feedback circuit in which a liquid filled parallel plate device is located in the forward loop. Alternatively, an inductive device may be located in the feedback circuit. The output signal from the parallel plate device is fed into the inverting input of an amplifier. The amplifier output is fed back through resistors to differential plates at the input to the parallel plate device. Since the parallel plate device, and hence the liquid medium and all of the properties of the sensor and medium, are in the forward loop, the output of the device is dependent upon the area of the plates, and not upon the electrical or temperature characteristics of the sensor or sensing medium. This eliminates the need for active temperature compensation by making the gain of the liquid irrelevant yet still uses the electrical characteristics of the liquid to identify the area of the plates actually covered by the liquid.

The parallel plate device of the present invention is comprised of two double sided circuit boards connected by a non-conducting circumferential wall, the boards joined together to form a sealed interior cavity. The interior sides of the circuit boards comprise the conductive plates. One of the conductive plates covers substantially the entire surface of one of the circuit boards, and may be referred to as a full plate. The other conductive plate is a set of differential plates, separated by a non-conducting barrier. The opposite side of each double sided circuit board, that is the outer side of the parallel plate device, contains the circuitry of the parallel plate device. The circuitry need not be integral to the parallel plate device, but that design is more easily utilized in application. The full plate double sided circuit board has a plated through hole for connection to its opposite side and for introduction of fluid into the parallel plate device after the circuit boards and the non-conducting circumferential wall are sealed. The differential plates will generally also have plated through holes for connection to the circuitry of the opposite sides of the circuit board. The fluid introduced into the cavity between the two circuit boards may be capacitive in nature, or it may be resistive, or it may be both. A non-conductive coating may be used to cover the inner plates to make the process only capacitive in nature.

In general, the device functions as follows. An input signal is connected to one of the parallel plates, the signal is driven through the liquid medium, and the resultant signal is sensed at the opposite parallel plate. The signal may be driven or sensed from either the full plate or the differential plates. Signal processing such as a demodulator and a filter, together with the feedback circuit, provide an output signal that is a function of the ratio of the difference in area covered by the liquid of the two sections of the differential plates, to the sum of areas covered by the liquid of the two sections of the differential plates.

The resultant output signal may be used in many different ways. For example, holding the amount of fluid constant would result in the output signal varying proportionally to the angle of inclination of the parallel plate device. This configuration would be used as an inclinometer. Similarly, by not holding the amount of liquid constant, and changing the geometry of the plate configuration, the output of the device can be a function of the level of fluid in the container. However, both configurations are similar in that they are not sensitive to changing liquid electrical and temperature characteristics, but yet the geometry of the construction uses the resistive, capacitive, or both resistive and capacitive properties of the liquid medium.

Because the device is dependent upon the geometry of the plates, the geometry of the device can be changed to linearize output for a particular physical situation. Plate geometry may be chosen to linearize output for any shape of tank.

The parallel plate device may be implemented into the feedback circuit in two different ways as mentioned above. The first way is to send an input signal into the differential plates, with one signal being inverted relative to the other, and to sense with the full plate. In this configuration, a variation of the differential plate configuration would allow plate feedback to be used. In a plate feedback configuration, the amplifier means need not be a differential amplifier. A common mode amplifier may be used. Driving through the differential plates is the preferred method of implementation.

The parallel plate device may also be fed a signal through the full plate, and sensed using the differential plates. This configuration may not be used with a plate feedback, and a differential amplifier is required since output signals are coming from two plates.

Common applications of the circuit and sensor device of the present invention include liquid level sensors, differential angle detectors, impedance ratios, and aircraft applications. The liquid level sensing applications are especially useful in the automotive industry, where such sensors are used in fluid tanks such as those for gas, oil, and other fluids. Differential angle detecting (liquid pendulum) has a number of uses, again especially in the automotive industry, for such applications as theft deterrent devices and could be adapted to be used in such applications as automatic adjustment of suspension systems in automobiles, depending on varying driving conditions. In any industrial application in which liquid level or angle detection is needed, the invention could find use, but it is well suited for the harsh conditions of automotive use. The differential angle detector application is useful in many aircraft applications, such as determining attitude in an aircraft, pitch and roll in a rotary wing aircraft, or aileron position. Other potential applications include construction equipment warning systems, such as to detect when a crane boom or other device tilts to a specified angle, beyond which an unsafe tipping moment would be exceeded, or low fluid level detecting for any number of applications. Detection of tipping to a specified angle could also be used in large ladders such as those used by fire fighters.

Because the liquid medium of the present invention is placed into the forward loop, the change of dielectric characteristics of the liquid becomes irrelevant to the measurements being made, assuming that the time to reach equilibrium is small compared to the period of the drive signal. For these reasons, the elaborate, tightly controlled structure and capacitance of the prior art sensors are much less important for the present invention. A wide range of liquids is available for use in the parallel plate device of the present invention, including common liquids such as isopropyl alcohol and other alcohol-based liquids. A liquid having a wide temperature range and a high dielectric constant will allow better performance, but is not required for use in the feedback loop system of the present invention.

Alternatively, an inductive type sensor could be used. If placed in the forward loop of a feedback circuit, the changing properties of such an inductive sensor would also be rendered irrelevant in the sensing process.

These and other objects and benefits of the present invention will become apparent from the following detailed description thereof taken in conjunction with the accompanying drawings, wherein like reference numerals designate like elements throughout the several views.

DESCRIPTION OF THE DRAWINGS

FIG. 1 is a circuit diagram of a differential drive embodiment of the present invention;

FIG. 2 is a circuit diagram of a differential sense embodiment of the present invention;

FIG. 3 is an exploded view of an inclinometer vial construction;

FIG. 3a is a section view of the non-conducting ring of FIG. 3 along lines 3a—3a thereof;

DESCRIPTION OF THE PREFERRED EMBODIMENT

Figures 4, 5, 5A:
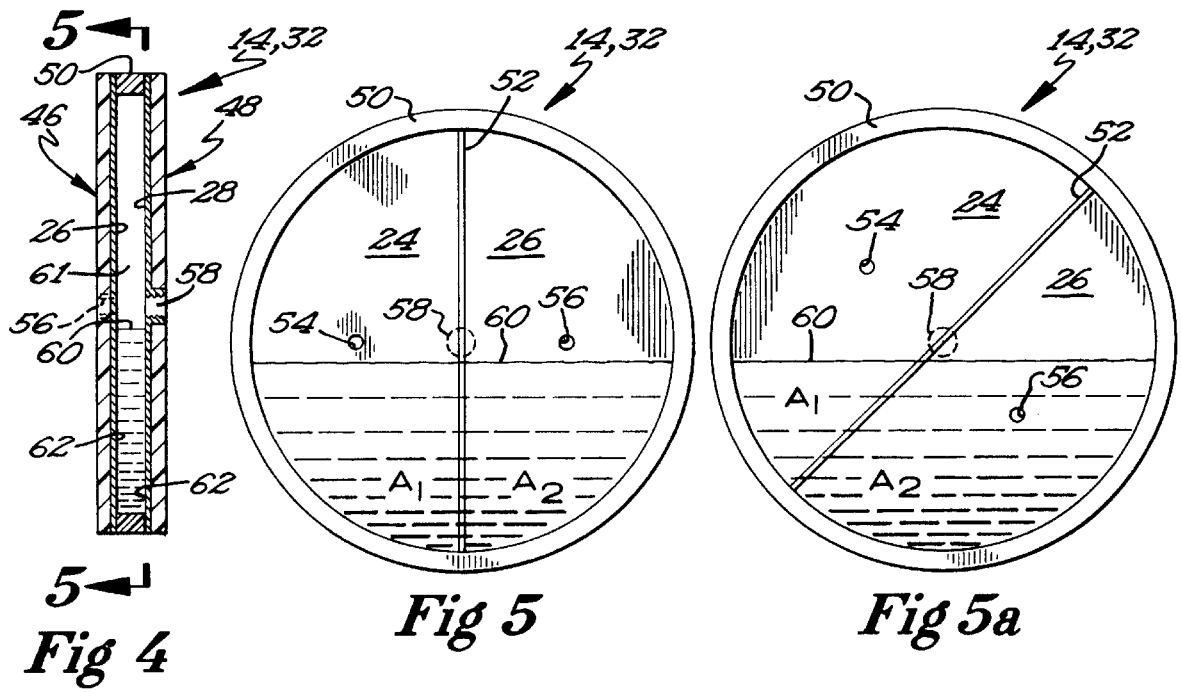
FIG. 4 is a view of the inclinometer vial of FIG. 3 along lines 4—4 thereof.
FIG. 5 is a front elevation view of a differential plate in the vial of FIG. 4, along lines 5—5 thereof, with the vial level.
FIG. 5a is a front elevation view of a differential plate in the vial of FIG. 4, along lines 5—5 thereof, with the vial inclined.

Referring to FIG. 1, a liquid medium feedback circuit 10 may be seen in block diagram. Feedback circuit 10 places a liquid medium sensor in the forward loop in order to provide an output signal independent of the gain in the liquid of the sensor due to changing temperature and electrical characteristics of the sensor and sensing medium. The circuit 10 is connectable to input signal generator 12. An input signal from signal generator 12 is fed to liquid pendulum 14 through node resistors 16. Liquid pendulum 14 output is fed to amplifier 18. Output from amplifier 18 is returned through resistors 22 to the input of liquid pendulum 14 by feedback line 20. Liquid pendulum 14 has various configurations which may be used in feedback circuit 10. The input signal from signal generator 12 may be driven into differential plates 24, 26, through a liquid medium, and sensed with a full plate 28 as is shown in FIG. 1. Resistors 22 and 16 together provide a summing junction. If the liquid pendulum 14 is driven from the two differential plates 24, 26 and sensed with a full plate 28 as is shown in FIG. 1, the input signal is fed separately to the two plates 24, 26, with one of the signals being inverted by inverter 30 before being fed through node resistor 16.

Alternatively, an input signal could be fed from signal generator 34 into a full plate 28 and sensed with the differential plates 24, 26, as shown in FIG. 2. Referring to FIG. 2, the configuration with liquid pendulum 32 being driven through the full plate 28 and sensed with parallel plates 24, 26 is shown. In this configuration, input signal generator 34 feeds an input signal to liquid pendulum 32 through node resistor 33. The dual output from liquid pendulum 32 is fed into differential amplifier 36 as well as common mode amplifier 38. Output is fed through line 40 and resistor 42 back to the drive plate 28 of liquid pendulum 32. Resistor 42 and node resistor 33 form a sunning function. Liquid pendulum 32 is identical to liquid pendulum 14, but is driven through full plate 28 as opposed to differential plates 24 and 26.

Referring to FIG. 3, the construction of liquid pendulum 14 or 32 may be seen. The liquid pendulum is comprised of double sided circuit boards 46 and 48, with the double sided circuit boards 46 and 48 separated by a circumferential nonconducting ring 50. The circuit boards 46, 48 and the nonconducting ring 50 define an internal cavity 61 therebetween. Nonconducting ring 50 is preferably constructed from PVC. Other materials may be used, but must be capable of forming a seal with circuit boards 46 and 48. Ring 50 may have an annular concave recess 51 (FIG. 3a), which will allow the liquid meniscus to release better. This recess 51 is positioned along the inner surface of non-conducting ring 50. Double sided circuit board 46 carries differential plates 24 and 26. Differential plates 24 and 26 are separated by a nonconducting barrier 52. Double sided circuit board 48 carries conducting plate 28, which covers substantially the full inner side of double sided circuit board 48. Conducting plate 24 has plated through hole 54 for connection to the opposite side of the double sided circuit board 46. Conducting plate 26 has plated through hole 56 for connection to the opposite side of double sided circuit board 46. Full conducting plate 28 has plated through hole 58 for connection to the opposite side of double sided circuit board 48. Plated through hole 58 is also used for filling the assembled liquid pendulum 14 or 32 with an appropriate liquid. Plates 24 and 26 may be referred to collectively as a differential plate. Circuit boards 46 and 48 may be connected together with circumferential ring 50 by any sealing means, however epoxy is preferred.

FIG. 4 shows a side section view of the liquid pendulum 14, 32 shown in FIG. 3. The pendulum is partially filled with liquid 60, so that rotation of pendulum will cause different areas $A_1$ and $A_2$ of plates 24 and 26 to be covered with liquid 60. Liquid 60 may be capacitive, resistive, or both in nature. Isopropyl alcohol and other alcohol based liquids are preferred. Plates 24 and 26 may be covered by a thin nonconductive coating 62. This coating 62 is a resistive barrier which can make the signal process entirely capacitative in nature. It also serves the dual purpose of fully sealing the differential plates. The preferred material used for coating 62 is a polymer, such as parylene.

The resistive barrier 62 also serves to eliminate residual resistance in the liquid 60. If this residual resistance in the liquid 60 is not eliminated, it could lead to current flow imbalances resulting in electroplating which could dissolve the conducting plates and ruin the sensor. Plated through hole 58 is used to partially fill the liquid pendulum with liquid 60 after assembly thereof. The liquid 60 used in the liquid pendulum should ideally have a wide temperature range and a high dielectric constant, but the placement of the pendulum in the forward loop allows the use of such liquids as isopropyl alcohol, and other alcohol based liquids.

FIGS. 5 and 5a show the liquid pendulum used as an angle detector. When the pendulum is used as an angle detector, the amount of liquid 60 within cavity 61 between circuit boards 46 and 48 is held constant. The pendulum is shown in both an upright and a tilted orientation. In the upright orientation, liquid 60 will cover area $A_1$ of plate 24 and area $A_2$ of plate 26. These areas will be equal, and no differential signal will exist between the two plates. When the pendulum is tilted, as shown in Fig. 5a, the total area covered by liquid 60 remains the same, but the areas $A_1$ and $A_2$ covered by liquid 60 differ. This difference in covered area creates a differential signal proportional to the angle of inclination of the liquid pendulum. With the semi-circular plates 24 and 26 shown, the differential signal has a linear proportion to the angle of rotation. The differential signal creates a voltage output from circuit 10 that is linearly proportional to the angle of rotation of the liquid pendulum. If nonlinear output is desired, the geometric shape of plates 24 and 26 may be varied.

Figures 6, 7:
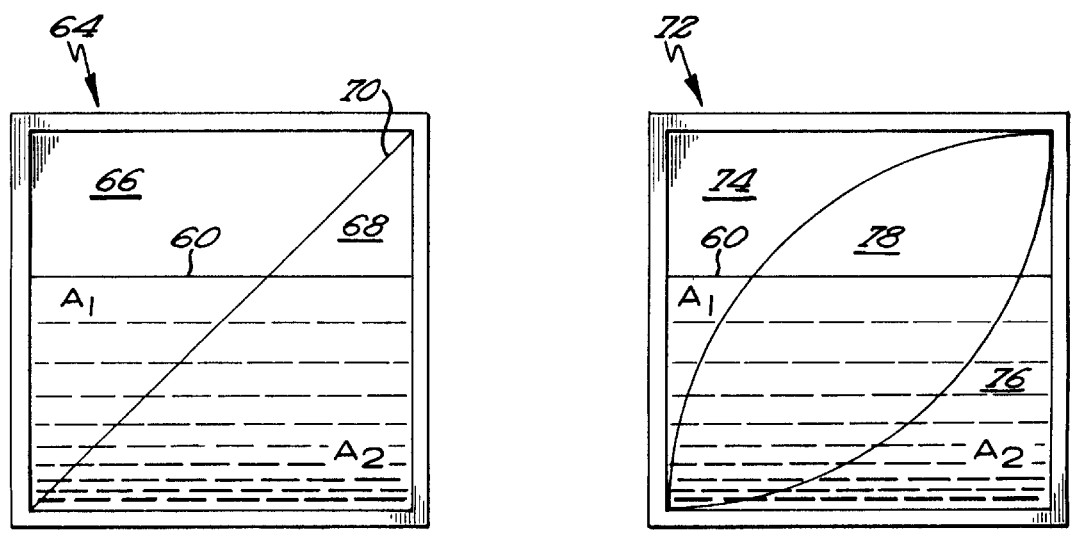
FIG. 6 is a front elevation view of a differential plate showing geometry for liquid level measurement of a rectangular volume tank.
FIG. 7 is a front elevation view of a differential plate showing geometry for liquid level measurement of a conical tank.

The sensor circuit 10 is also applicable to liquid level sensing. The general construction of the liquid level liquid vial used as a liquid level sensor is the same as that of pendulums 14 and 32. In the liquid level sensor, however, the amount of liquid 60 filling cavity 61 between plates 46 and 48 is allowed to change based on the liquid level in the container or tank to be measured. Further, the geometry of the parallel plates will change for liquid level sensing. FIG. 6 shows a square differential plate 64 divided into two identical triangular half plates 66 and 68. Triangular plates 66 and 68 are separated by a nonconducting barrier 70. A differential such as plate 64 may be connected to similarly shaped solid plate (not shown) as has been described above and shown in FIG. 3. With varying amounts of liquid 60 covering half plates 66 and 68, the area A, of plate 66 covered by liquid 60 and the area $A_2$ of plate 68 covered by liquid 60 will generate a unique differential signal depending upon the level of the liquid. The geometry of plates 66 and 68 may be adjusted to accurately measure level for the volumetric shape of any tank in which liquid level is to be measured. The configuration of plates 66 and 68 shown in FIG. 6 corresponds to linear output for liquid level measurement in a rectangular tank.

Plate geometry may be adjusted to provide a linear output proportional to liquid level for any shape of tank being measured. The processing output may therefore be proportional to volume as opposed to height. For example, differential plate 72 shown in FIG. 7 comprises a first plate section 74 and a second plate section 76, with the two plate sections 74 and 76 having non-conducting area 78 between them. Such a plate configuration will result in linear output for a conical tank. The geometry of differential plate sections on a differential plate may be adjusted depending upon the shape of the tank in which liquid level is to be measured. The differential signal provided between the two plate sections may then be correlated to a voltage output that is linearly proportional to the liquid level in the tank.

Since all of the liquid medium sensors discussed above are placed in the forward loop of feedback circuit 10, the temperature and electrical characteristics of the sensor and sensing medium are irrelevant. The use of feedback makes any gain of the liquid irrelevant assuming that the time to reach equilibrium is small compared to the period of the drive signal. It is preferable that the signal generators 12, 34 of the feedback circuit 10 provide a digital signal, however it is well within the capability of one of ordinary skill in the art to modify the circuit 10 to accept and perform with an analog signal.

Figure 8:
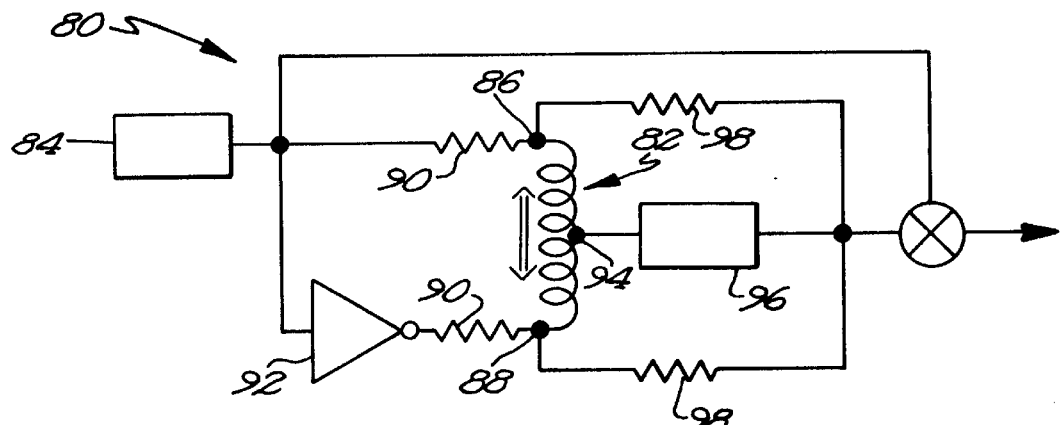
FIG. 8 is a circuit diagram of an inductive differential drive embodiment of the present invention.

While a liquid medium sensor is shown and described above, the sensing medium need not be a liquid. Indeed, it need not be capacitive or resistive in nature. For example, FIG. 8 shows a circuit diagram 80 defining an inductive embodiment of the sensor circuit. Instead of using a liquid medium, an inductive means 82 is used as the sensing medium. Signal generator 84 provides input signals to the input terminals 86 and 88 of inductive sensing means 82 through node resistors 90. One of the signals is inverted by inverter 92. Output terminal 94 of inductive sensing means 82 is connected to amplifier 96. The output from amplifier 96 is fed through resistors 98 back to the input terminals 86 and 88 of inductive sensing means 82. The output signal generated will be proportional to the position of a moving section of inductive means 82 relative to the input terminals 86 and 88.

Figure 9:
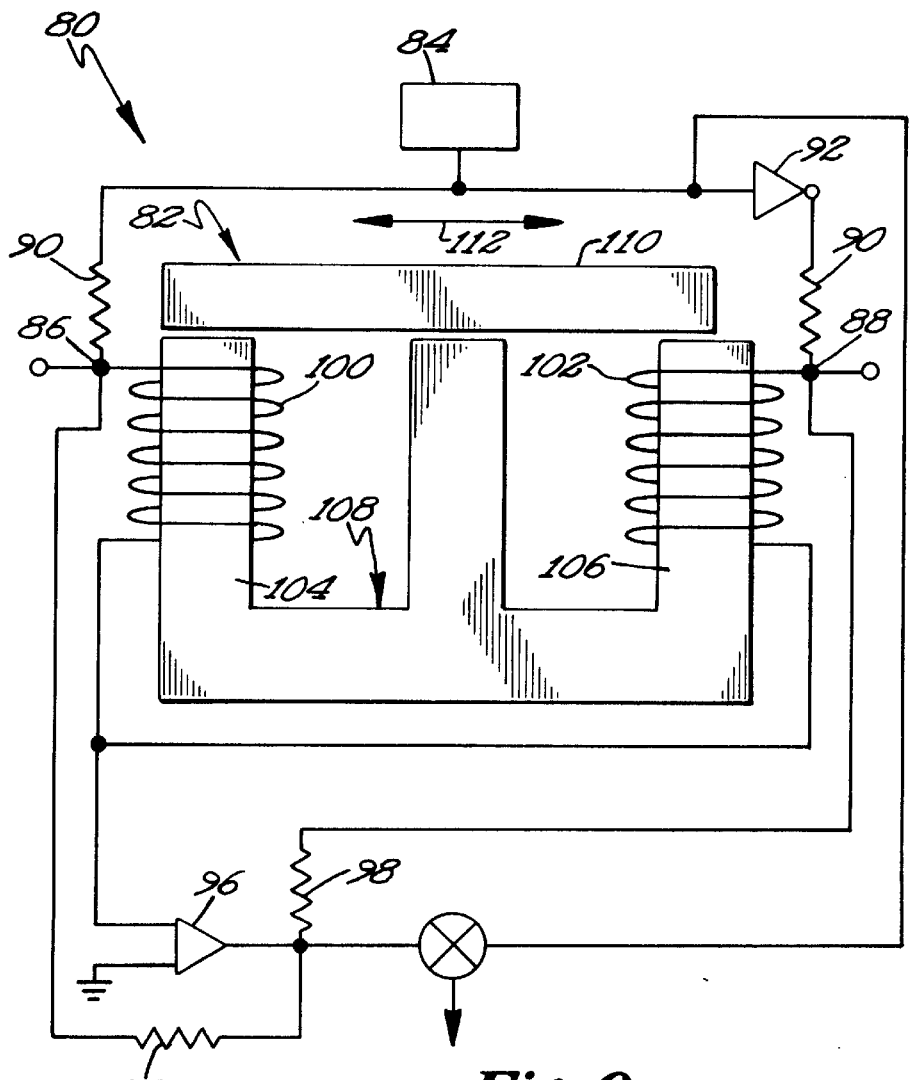
FIG. 9 is a circuit diagram of the circuit of FIG. 8, and showing detail of the inductive sensor.

A more detailed view of the embodiment of the inductive sensing means 82 is shown in the circuit diagram of FIG. 9. Instead of the differential in area covered by a liquid as in the liquid medium sensors described above, the inductive sensing means 82 relies on a variance between the current in coils 100 and 102. Coils 100 and 102 are wrapped around depending legs 104 and 106 respectively of core member 108. The location of movable bar 110 which moves linearly in directions 112 determines the current in coils 100 and 102. The differential between the currents in coils 100 and 102 results in an output signal that is proportional to the linear location of movable bar 110.

Figure 10:
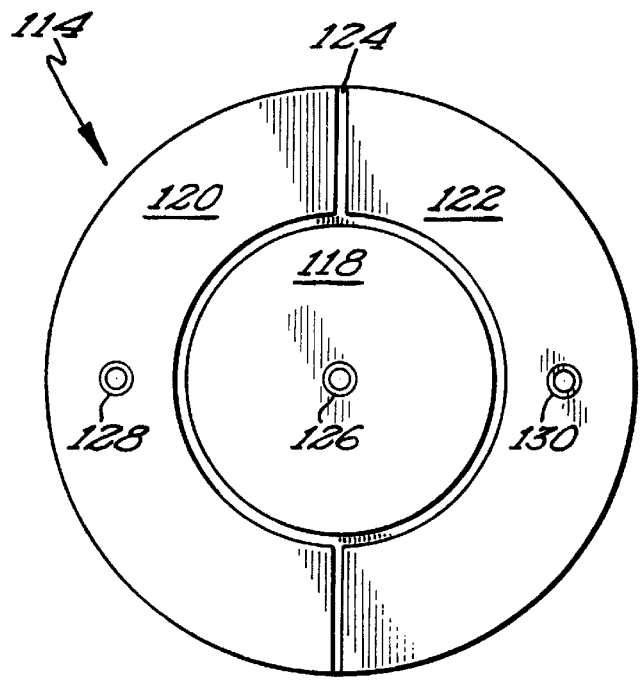
FIG. 10 is a front elevation view of an embodiment of a plate feedback plate.
Figure 11:
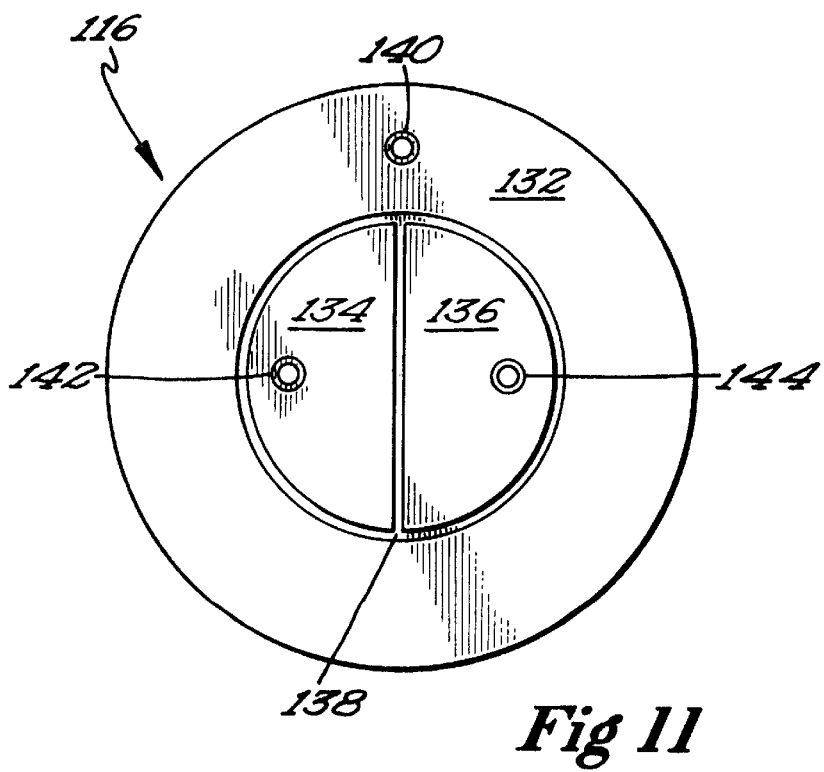
FIG. 11 is a front elevation view of an alternative embodiment of the plate feedback plate.

FIGS. 10 and 11 show alternative differential drive plates 114 and 116. Each alternative differential drive plate 114, 116 embodies plate feedback to null the effect of the input signal on the plates themselves. When using plate feedback such as disclosed in FIGS. 10 and 11, the output signal from the amplifier is fed back to the feedback plate section of the plates 114, 116. On plate 114, the plate feedback section 118 is located at the center of plate 114. First and second differential drive plates 120 and 122 are half ring shaped. A nonconductive barrier 124 separates plate feedback section 118 and differential drive plate sections 120 and 122. Each of the plate sections 118, 120, and 122 has a plated through hole 126, 128, and 130 respectively for connection to the opposite side of the circuit board upon which the plates are mounted. Similarly, feedback plate 116 has plate feedback sections 132, which is ring shaped, and first and second differential plate sections 134 and 136. Nonconducting barrier 138 separates plate sections 132, 134, and 136. Each plate section 132, 134, and 136 has a plated through hole 140, 142, and 144 respectively, for connection to the other side of the circuit board to which the plate sections are mounted. The conducting plates need not be mounted on circuit boards, but when the boards are so mounted this makes the device smaller and easier to produce.

In operation, the liquid medium embodiments of the sensor and sensor circuit 10 operate as follows. When liquid pendulum 14 has differential drive plates 24 and 26 as inputs as shown in FIG. 1, the signal from signal generator 12 is fed to the drive plates 24 and 26. The signal is inverted by inverter 30 prior to being fed to one of the drive plates, so that the signals reaching the differential drive plates 24 and 26 are equal but opposite. Full plate 28 is used to sense differential signals between the differential plates 24, 26 depending upon the relative area $A_1$ and $A_2$ covered by the liquid 60 within liquid pendulum 14. The output is fed to amplifier 18, and the output from amplifier 18 is fed through a summing junction including resistors 22 and node resistors 16 back to drive plates 24 and 26. In this manner, the placing of the liquid pendulum 14 into the forward loop of the feedback circuit eliminates the relevance of the temperature and electrical characteristics of the liquid 60 in the pendulum 14.

Referring to FIG. 2, when the input signal from signal generator 34 is fed to the full plate 28 of liquid pendulum 32 as an input, differential plates 24 and 26 are used as sense plates as opposed to drive plates. The output from plates 24 and 26 is fed to differential amplifier 36 and common mode amplifier 38. Output from common mode amplifier 38 is fed back to full plate 28 with resistor 42 and node resistor 33 forming a summing junction. The output from differential amplifier 36 provides a representation of the differential between the areas $A_1$ and $A_2$ covered by the liquid 60 in pendulum 32.

Sensors 14 and 32 are identical except for the fact that they are used in different manners by the circuits represented in FIG. 1 and FIG. 2. In FIG. 1, the differential plates are used as drive plates, while in FIG. 2 the differential plates are used as sense plates. Despite the usage, the construction and operation of liquid pendulums 14 and 32 is the same. If the liquid pendulum is to be used as an inclinometer, the amount of liquid 60 within the cavity 62 between the two circuit boards 46 and 48 is held constant. When the pendulum is in an upright position, as represented in FIG. 5, the areas $A_1$ and $A_2$ of the differential plates 24 and 26 covered by liquid 60 are identical, and no differential signal exists. When the pendulum is tilted, as shown in FIG. 5a, the areas $A_1$ and $A_2$ of the differential plates 24 and 26 covered by liquid 60 differ, although the total area covered by liquid 60 remains the same. The differential signal between the two plates 24 and 26 creates a voltage output dependent upon the angle of inclination of the pendulum. The geometry of plates 24 and 26 is chosen to provide a linear output proportional to the angle of inclination. If, however, a non-linear output is desired, or a non-uniform tank is used, the geometry of plates 24 and 26 may be adjusted to so provide. More than two plate sections may be required, with portions of the plate being non-conducting, as shown in FIG. 7.

If the liquid medium vial is to be used as a liquid level sensor, the n the configurations shown in FIGS. 6 and 7 for the conducting plates 64 and 72 are desirable. If the sensor is to be used as a liquid level sensor, the amount of liquid 60 within cavity 62 of the sensor is allowed to vary. As the liquid level in the cavity changes the areas $A_1$ and $A_2$ covered by liquid, a differential signal proportional to the height of the liquid in the cavity is generated. The areas of the two or more differential plate sections can be designed to linearize the geometry of the tank being measured so that the processing output is proportional to volume instead of height. For example, the plate geometry shown in FIG. 7 for plates 74 and 76, and non-conducting area 78, linearizes the output to determine liquid level in a conical tank. Similarly, plate geometry may be adjusted to provide a linear output for a particular tank shape.

When an inductive sensing circuit 80 is used, the signal from signal generator 84 is fed through coils 100 and 102 of inductive sensing mean s 82. The linear position of movable bar 110 in relation to depending core legs 104 and 106 determines the differential output from the inductive sensing means 82. This output is amplified by amplifier 96 and fed back through resistors 98 to the input points 86 and 88 of inductive sensing means 82. In this manner, the linear position of movable bar 110 generates the differential signal. The output signal generated is proportional to the linear position of the bar 110.

The detailed description outlined above is considered to be illustrative only of the principles of the invention. Numerous changes and modifications will occur to those skilled in the art, and there is no intention to restrict the scope of the invention to the detailed description. The preferred embodiment of the invention having been described in detail, the scope of the invention should be defined by the following claims.

What is claimed is:

1. A circuit for generating an output signal, driven by an input signal, said circuit comprising:
   a sensor having two input points and an output point;
   said sensor comprising:
      a movable medium: and
      two signal generating elements connected in the circuit to each generate an intermediate output signal determined by the position of said movable medium relative to said signal generating elements, each intermediate output signal connected to said output point;
   said two input points connectable to the input signal;
   an amplifier;
   said output point connected to an input of said amplifier; and
   each of said two input points connected to the output of said amplifier; whereby the output signal correlated to the position of said movable medium is generated.

2. A circuit for generating an output signal, driven by an input signal, said circuit comprising:
   a sensor having two input points and an output point;
   said two input points connectable to the input signal;
   an amplifier;
   said output point connected to an input of said amplifier; and
   each of said two input points connected to the output of said amplifier;
   wherein said sensor is a liquid medium sensor.

3. The circuit of claim 2 wherein each of said two input points is connected through resistive means to said amplifier.

4. The circuit of claim 3 wherein said liquid medium sensor comprises:
   first and second conducting plates spaced apart from one another, and parallel;
   said first plate being a differential plate divided into two sections;
   a non-conducting circumferential wall connecting said first and said second plates;
   said first and second plates and said circumferential wall defining an interior cavity; and
   a liquid in said cavity partially covering said first and said second plates.

5. The circuit of claim 4, wherein said liquid is alcohol based.

6. The circuit of claim 4 wherein said plated through hole is sealed and the amount of liquid in said cavity is constant, whereby output from the circuit is proportional to the tilt angle of said sensor.

7. The circuit of claim 4 wherein said sensor is placed in a tank, and wherein the liquid level is allowed to vary in relation to the liquid level in the tank, whereby output from the circuit is proportional to the liquid level in the tank.

8. The circuit of claim 7 wherein the geometry of said conducting plates is varied to create a proportional output signal specific to the shape of the tank.

9. The circuit of claim 4, wherein said liquid is isopropyl alcohol.

10. The circuit of claim 4, and further comprising a plated through hole in said second plate for introduction of fluid into said cavity.

11. The circuit of claim 4 wherein said non-conducting circumferential wall has an annular concave recess along its inner surface, allowing better release of the liquid meniscus.

12. The circuit of claim 4 wherein said non-conducting circumferential wall is PVC.

13. The circuit of claim 4 wherein said first and said second plates are circular.

14. The circuit of claim 13 wherein:
   each said differential plate section is identical in shape;
   each said differential plate section is hemispherical; and
   the output signal is proportional to the angular displacement of said liquid medium sensor.

15. The circuit of claim 4 wherein said first and said second plates are rectangular.

16. The circuit of claim 15 wherein:
   each said differential plate section is identical in shape;
   each said differential plate section is triangular; and
   the output signal is proportional to the liquid level in said liquid medium sensor.

17. The circuit of claim 4 wherein each of said differential plate sections is coated with a non-conducting coating.

18. The circuit of claim 17 wherein said nonconducting coating is a polymer.

19. The circuit of claim 15 wherein said polymer is parylene.

20. The circuit of claim 4 wherein said amplifier is a common mode amplifier.

21. The circuit of claim 4, and further comprising:
   a first and a second double sided circuit board;
   said first plate mounted to a side of said first double sided circuit board;

said second plate mounted to a side of said second double sided circuit board;

two plated through holes in said first double sided circuit board for connection of each of said first plate sections to the other side of said first double sided circuit board;

a plated through hole in said second double sided circuit board for connection of said second plate to the other side of said second double sided circuit board.

22. The circuit of claim 21 wherein said amplifier is mounted to said other side of one of said double sided circuit boards.

23. The circuit of claim 22 wherein said resistive means is mounted to said other side of one of said double sided circuit boards.

24. A circuit for generating an output signal, driven by an input signal, said circuit comprising:

a sensor having an input point and two output points;

said input point connectable to the input signal;

an amplifier;

each of said output points connected to an input of said amplifier; and said input point connected to the output of said amplifier;

wherein said sensor is a liquid medium sensor.

25. The circuit of claim 24 wherein said input point is connected to said amplifier through resistive means.

26. The circuit of claim 24 wherein said sensor is a liquid pendulum.

27. The circuit of claim 24 wherein said liquid medium sensor comprises:

first and second conducting plates spaced apart from one another, and parallel;

said first plate being a differential plate divided into two sections;

a non-conducting circumferential wall connecting said first and said second plates;

said first and second plates and said circumferential wall defining an interior cavity; and a fluid in said cavity partially covering said first and said second plates.

28. The circuit of claim 27, wherein said liquid is alcohol based.

29. The circuit of claim 27, wherein said liquid is isopropyl alcohol.

30. The circuit of claim 27, and further comprising a plated through hole in said second plate for introduction of fluid into said cavity.

31. The circuit of claim 27 wherein said non-conducting wall has an annular concave recess along its inner surface, allowing better release of the liquid meniscus.

32. The circuit of claim 27 wherein said non-conducting circumferential wall is PVC.

33. The circuit of claim 27 wherein said first and said second plates are circular.

34. The circuit of claim 27 wherein each said differential plate section is hemispherical.

35. The circuit of claim 27 wherein each of said differential plate sections is coated with a non-conducting coating.

36. The circuit of claim 1, wherein said sensor is an inductive sensor.

37. The circuit of claim 1 wherein:

each said signal generating element comprises:
a core; and
a coil surrounding said core; and said movable medium is a linear member.

38. The circuit of claim 36, wherein:

each said signal generating element comprises:
a core member; and
a coil surrounding said coil member and capable of carrying current correlated to each said intermediate output signal; and said movable medium is a linear element;

whereby the current in each coil is determined by the position of said linear element.

* * * * *

UNITED STATES PATENT AND TRADEMARK OFFICE
CERTIFICATE OF CORRECTION

PATENT NO.    : 5,802,728
DATED         : September 8, 1998
INVENTOR(S)   : Karnick et al.

It is certified that error appears in the above-identified patent and that said Letters Patent is hereby corrected as shown below:

Column 7,
Line 1, delete "A," and insert therefor -- A1 --

Column 9,
Line 8, delete "the n" and insert therefor -- then --

Column 10,
Line 20, delete "4" and insert -- 10 --
Line 60, delete "15" and insert -- 18 --.

Signed and Sealed this

Thirteenth Day of May, 2003

JAMES E. ROGAN
*Director of the United States Patent and Trademark Office*